US009367987B1

(12) United States Patent
Brunell et al.

(10) Patent No.: US 9,367,987 B1
(45) Date of Patent: Jun. 14, 2016

(54) SELECTING COLOR IN WAGERING GAME SYSTEMS

(75) Inventors: Edward G. Brunell, Chicago, IL (US); Paul J. Radek, Naperville, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 56 days.

(21) Appl. No.: 13/094,560

(22) Filed: Apr. 26, 2011

Related U.S. Application Data

(60) Provisional application No. 61/327,940, filed on Apr. 26, 2010.

(51) Int. Cl.
*A63F 13/00* (2014.01)
*G07F 17/32* (2006.01)

(52) U.S. Cl.
CPC .................................. *G07F 17/3211* (2013.01)

(58) Field of Classification Search
CPC .................................................. G07F 17/3211
USPC ........................................................... 463/30
See application file for complete search history.

(56) References Cited

U.S. PATENT DOCUMENTS 5,259,613 A 11/1993 Marnell, II
5,483,631 A * 1/1996 Nagai et al. ................... 715/736
5,633,933 A 5/1997 Aziz
6,040,831 A 3/2000 Nishida
6,081,266 A 6/2000 Sciammaella
6,146,273 A 11/2000 Olsen
6,217,448 B1 4/2001 Olsen
6,339,796 B1 1/2002 Gambino
6,632,093 B1 * 10/2003 Rice et al. ....................... 434/98
6,647,119 B1 11/2003 Slezak
6,843,723 B2 1/2005 Joshi
6,927,545 B2 8/2005 Belliveau
6,939,226 B1 9/2005 Joshi
6,960,136 B2 11/2005 Joshi et al.

(Continued)

FOREIGN PATENT DOCUMENTS

EP 1439507 7/2004
WO WO-2004014501 2/2004

(Continued)

OTHER PUBLICATIONS

U.S. Appl. No. 12/797,756, filed Jun. 10, 2010, Berry, Robert G., et al.

(Continued)

*Primary Examiner* — Milap Shah
*Assistant Examiner* — Thomas H Henry
(74) *Attorney, Agent, or Firm* — DeLizio Law, PLLC

(57) ABSTRACT

This document describes techniques for selecting lighting colors in wagering game systems. In some embodiments, a wagering game machine comprising a game controller configured to determine a result for a wagering game, and control presentation of video content indicating the results for the wagering game. The game controller can also select, in response to the result, lighting content and one or more color pallets, wherein the lighting content defines choreographed lighting effects, and wherein the one or more color pallets define coloring for the lighting effects. The wagering game machine can also include a lighting engine configured to randomly select colors from the one or more color pallets, and control presentation of the lighting effects based on the lighting content and the randomly selected colors.

21 Claims, 5 Drawing Sheets

(56) References Cited

U.S. PATENT DOCUMENTS 6,972,528 B2 12/2005 Shao et al.
6,974,385 B2 12/2005 Joshi et al.
6,991,543 B2 1/2006 Joshi
6,997,803 B2 2/2006 LeMay et al.
7,082,572 B2 7/2006 Pea et al.
7,112,139 B2 9/2006 Paz Barahona et al.
7,181,370 B2 2/2007 Furem et al.
7,228,190 B2 6/2007 Dowling et al.
7,269,648 B1 9/2007 Krishnan et al.
7,364,508 B2 4/2008 Loose et al.
7,367,886 B2 5/2008 Loose et al.
7,449,839 B1 11/2008 Chen et al.
7,479,063 B2 1/2009 Pryzby et al.
7,495,671 B2 2/2009 Chemel et al.
7,550,931 B2 6/2009 Lys et al.
7,666,091 B2 2/2010 Joshi et al.
7,682,249 B2 3/2010 Winans et al.
7,811,170 B2 10/2010 Winans et al.
7,867,085 B2 1/2011 Pryzby et al.
8,591,315 B2 11/2013 Gagner et al.
8,613,667 B2 12/2013 Brunell et al.
8,622,830 B2 1/2014 Radek et al.
8,814,673 B1 8/2014 Brunell et al.
8,840,464 B1 9/2014 Brunell et al.
9,011,247 B2 4/2015 Gronkowski et al.
2001/0021666 A1 9/2001 Yoshida et al.
2002/0010018 A1 1/2002 Lemay et al.
2002/0055978 A1 5/2002 Joon-Boo et al.
2002/0160826 A1 10/2002 Gomez et al.
2003/0002246 A1 1/2003 Kerr
2003/0007648 A1 1/2003 Currell
2003/0017865 A1 1/2003 Beaulieu et al.
2003/0130033 A1 7/2003 Loose
2003/0132722 A1 7/2003 Chansky et al.
2004/0072610 A1 4/2004 White et al.
2004/0160199 A1* 8/2004 Morgan et al. ................ 315/312
2004/0178750 A1 9/2004 Belliveau
2004/0209692 A1 10/2004 Schober et al.
2005/0043090 A1 2/2005 Pryzby et al.
2005/0054440 A1 3/2005 Anderson et al.
2005/0077843 A1 4/2005 Benditt
2005/0116667 A1 6/2005 Mueller et al.
2005/0128751 A1 6/2005 Roberge et al.
2005/0153780 A1 7/2005 Gauselmann
2005/0164785 A1 7/2005 Connelly
2005/0164786 A1 7/2005 Connelly
2005/0164787 A1 7/2005 Connelly
2005/0164788 A1 7/2005 Grabiec
2005/0174473 A1 8/2005 Morgan et al.
2005/0200318 A1 9/2005 Hunt et al.
2005/0239545 A1* 10/2005 Rowe .............................. 463/29
2005/0248299 A1 11/2005 Chemel et al.
2005/0275626 A1 12/2005 Mueller et al.
2005/0277469 A1 12/2005 Pryzby et al.
2005/0282631 A1 12/2005 Bonney et al.
2006/0009285 A1 1/2006 Pryzby et al.
2006/0022214 A1 2/2006 Morgan et al.
2006/0046829 A1 3/2006 White
2006/0076908 A1 4/2006 Morgan et al.
2006/0244622 A1 11/2006 Wray
2006/0253781 A1 11/2006 Pea et al.
2007/0004510 A1 1/2007 Underdahl et al.
2007/0008711 A1 1/2007 Kim
2007/0032288 A1 2/2007 Nelson et al.
2007/0036368 A1 2/2007 Hettinger et al.
2007/0111776 A1 5/2007 Griswold et al.
2007/0189026 A1 8/2007 Chemel et al.
2007/0218970 A1 9/2007 Patel et al.
2007/0218974 A1 9/2007 Patel et al.
2007/0219000 A1 9/2007 Aida
2007/0291483 A1 12/2007 Lys
2007/0293304 A1 12/2007 Loose et al.
2008/0039213 A1 2/2008 Cornell et al.
2008/0070685 A1 3/2008 Pryzby et al.
2008/0094005 A1 4/2008 Rabiner et al.
2008/0113715 A1 5/2008 Beadell et al.
2008/0113796 A1 5/2008 Beadell et al.
2008/0113821 A1 5/2008 Beadell et al.
2008/0143267 A1 6/2008 Neuman
2008/0161108 A1 7/2008 Dahl et al.
2008/0176647 A1 7/2008 Acres
2008/0231203 A1 9/2008 Budde et al.
2008/0274793 A1 11/2008 Selig et al.
2008/0288607 A1 11/2008 Muchow
2008/0309259 A1 12/2008 Snijder et al.
2009/0009997 A1 1/2009 Sanfilippo et al.
2009/0023485 A1 1/2009 Ishihata et al.
2009/0149242 A1 6/2009 Woodward et al.
2009/0170597 A1 7/2009 Bone et al.
2009/0197673 A1 8/2009 Bone et al.
2009/0206773 A1 8/2009 Chang
2009/0270167 A1 10/2009 Ajiro et al.
2009/0298579 A1 12/2009 Radek et al.
2009/0318223 A1 12/2009 Langridge et al.
2010/0022298 A1 1/2010 Kukita
2010/0022305 A1 1/2010 Yano
2010/0029385 A1 2/2010 Garvey et al.
2010/0031186 A1 2/2010 Tseng et al.
2010/0075750 A1 3/2010 Bleich et al.
2010/0113136 A1 5/2010 Joshi et al.
2010/0171145 A1 7/2010 Morgan et al.
2010/0213876 A1 8/2010 Adamson et al.
2010/0234107 A1 9/2010 Fujimoto et al.
2010/0277079 A1 11/2010 Van Der Veen et al.
2010/0309016 A1 12/2010 Wendt et al.
2010/0317437 A1 12/2010 Berry et al.
2011/0035404 A1 2/2011 Morgan et al.
2011/0045905 A1 2/2011 Radek
2011/0050101 A1 3/2011 Bailey et al.
2011/0070948 A1 3/2011 Bainbridge et al.
2011/0118018 A1 5/2011 Toyoda
2011/0118034 A1 5/2011 Jaffe et al.
2011/0190052 A1 8/2011 Takeda et al.
2012/0009995 A1 1/2012 Osgood
2012/0040738 A1 2/2012 Lanning et al.
2012/0122571 A1 5/2012 Desimone et al.
2012/0129601 A1 5/2012 Gronkowski et al.
2012/0178523 A1 7/2012 Greenberg et al.
2013/0005458 A1 1/2013 Kosta et al.
2013/0184078 A1 7/2013 Brunell et al.
2013/0310178 A1 11/2013 Pryzby
2014/0073430 A1 3/2014 Brunell et al.
2014/0228121 A1 8/2014 Berry et al.
2014/0228122 A1 8/2014 Berry et al.
2014/0335956 A1 11/2014 Brunell et al.

FOREIGN PATENT DOCUMENTS

WO WO2004075128 9/2004
WO WO2004075129 9/2004
WO WO2004086320 10/2004
WO WO2005113089 12/2005
WO WO2005114598 12/2005
WO WO2005114599 12/2005
WO WO2005117647 12/2005
WO WO2006017444 2/2006
WO WO2006017445 2/2006
WO WO2006033941 3/2006
WO WO2006039323 4/2006
WO WO2006125013 11/2006
WO WO2007022294 2/2007
WO WO2007022343 2/2007
WO WO-2007061904 5/2007
WO WO2007133566 11/2007
WO WO2008057538 5/2008
WO WO2008063391 5/2008
WO WO2008137130 11/2008
WO WO2009054930 4/2009
WO WO2010048068 4/2010
WO WO-2011005797 1/2011
WO WO2011005798 1/2011

(56) References Cited

FOREIGN PATENT DOCUMENTS

| | | |
|---|---|---|
| WO | WO2011014760 | 2/2011 |
| ZA | 20041110 | 8/2005 |

OTHER PUBLICATIONS

U.S. Appl. No. 12/860,467, filed Aug. 20, 2010, Radek, Paul. J.
U.S. Appl. No. 12/965,749, filed Dec. 10, 2010, Brunell, Edward G., et al.
U.S. Appl. No. 12/971,544, filed Dec. 17, 2010, Brunell, Edward G., et al.
U.S. Appl. No. 13/094,701, filed Apr. 26, 2011, Brunell, Edward G., et al.
U.S. Appl. No. 13/094,811, filed Apr. 26, 2011, Brunell, Edward G., et al.
U.S. Appl. No. 13/109.427, filed May 17, 2011, Brunell, Edward G., et al.
"PCT Application No. PCT/US10/41112 International Search Report", Sep. 2, 2010 , 11 pages.
"PCT Application No. PCT/US10/43886 International Search Report", Sep. 16, 2010 , 12 pages.
"U.S. Appl. No. 13/094,701 Office Action", Mar. 27, 2012 , 26 pages.
"U.S. Appl. No. 13/094,811 Office Action", Apr. 3, 2012 , 16 pages.
U.S. Appl. No. 61/412,304, filed Nov. 10, 2010, Brunell, Edward G., et al.
"U.S. Appl. No. 12/860,467 Office Action", Jan. 17, 2013 , 16 pages.
"U.S. Appl. No. 12/971,544 Final Office Action", Mar. 14, 2013, 38 pages.
Gusella, Riccardo et al., "An Election Algorithm for a Distributed Clock Synchronization Program", *Berkley* http://www.eecs. berkeley. edu/Pubs/TechRpts/1986/CSD-86-275.pdf Dec. 1985 , 19 pages.
"U.S. Appl. No. 12/965,749 Office Action", Nov. 8, 2012 , 30 pages.
"U.S. Appl. No. 12/971,544 Office Action", Nov. 6, 2012 , 43 pages.
"U.S. Appl. No. 13/094,701 Final Office Action", Nov. 28, 2012 , 14 pages.
U.S. Appl. No. 13/204,225, filed Aug. 5, 2011, Caporusso, Vito M., et al.
"PCT Application No. PCT/US10/41111 International Preliminary Report on Patentability", Oct. 24, 2011 , 13 pages.
"PCT Application No. PCT/US10/41111 International Search Report", Sep. 1, 2010 , 12 pages.
"PCT Application No. PCT/US10/43886 International Preliminary Report on Patentability", May 3, 2012 , 4 pages.
"U.S. Appl. No. 12/965,749 Final Office Action", Apr. 22, 2013 , 30 Pages.
"U.S. Appl. No. 13/204,225 Office Action", Feb. 27, 2013 , 19 pages.
"U.S. Appl. No. 13/204,225 Office Action", Jun. 22, 2012 , 23 pages.
"U.S. Appl. No. 13/382,783 Office Action", Feb. 28, 2012 , 26 pages.
"U.S. Appl. No. 13/094,811 Office Action", Jun. 21, 2013 , 19 pages.
U.S. Appl. No. 14/080,272, filed Nov. 14, 2013, Brunell, Edward G., et al.
"Coyote Moon", *IGT* http://web.archive.org/web/20131213220054/ http://media.igt.com/marketing/Promotionalliterature/ GamePromolit_111E3-29BC7.pdf2005 , 2 pages.
"Elvis Little More Action", *24Hr-Slots* http://www.24hr-slots.co. uk!WagerWorks/Eivis_ALMA.html Sep. 5, 2009 , 4 pages.
"U.S. Appl. No. 12/797,756 Office Action", Nov. 7, 2013 , 7 Pages.
"U.S. Appl. No. 12/965,749 Office Action", Dec. 17, 2013 , 35 Pages.
"U.S. Appl. No. 13/094,811 Final Office Action", Dec. 24, 2013 , 15 Pages.
"U.S. Appl. No. 13/388,118 Office Action", Oct. 11, 2013 , 9 Pages.
NYPHINIX13, , "Star Wars Cloud City Slot Bonus—IGT", *YouTube* http://www.youtube.com/watch?v=wfYL9hjLxg4 Mar. 18, 2010 , 1 page.
"U.S. Appl. No. 12/965,749 Office Action", Sep. 4, 2014, 33 Pages.
"U.S. Appl. No. 14/080,272 Office Action", Oct. 23, 2014, 5 Pages.
"U.S. Appl. No. 12/965,749 Final Office Action", Apr. 30, 2014, 40 Pages.
"U.S. Appl. No. 13/388,118 Final Office Action", May 23, 2014, 11 Pages.
Co-pending U.S. Appl. No. 14/254,656, filed Apr. 16, 2014, 63 pages.
Co-pending U.S. Appl. No. 14/446,081, filed Jul. 29, 2014, 40 pages.
"U.S. Appl. No. 12/965,749 Final Office Action", Dec. 15, 2014, 32 Pages.
"U.S. Appl. No. 12/965,749 Office Action", Mar. 18, 2015, 28 Pages.
Co-pending U.S. Appl. No. 14/677,660, filed Apr. 2, 2015, 46 pages.

* cited by examiner

| | column1 | column2 | column3 | column4 |
|---|---|---|---|---|
| pallet1 | green1 | green2 | green3 | green4 |
| pallet2 | blue1 | blue2 | blue3 | blue4 |
| pallet3 | red1 | red2 | red3 | red4 |
| pallet4 | yellow1 | yellow2 | yellow3 | yellow4 |
| ⋮ | ⋮ | ⋮ | ⋮ | ⋮ |

SELECTING COLOR IN WAGERING GAME SYSTEMS

RELATED APPLICATIONS

This application claims the priority benefit of U.S. Provisional Application Ser. No. 61/327,940 filed Apr. 26, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly wagering game systems that use color pallets for selecting lighting colors.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines.

Some wagering game systems attempt to enhance player experiences using multimedia, such as lighting effects, video, and sound. These systems may offer basic coordination between various media types (e.g., lighting and sound), while presenting other media independently (e.g., blinking lights may operate independent of other media). As wagering game systems evolve, those offering more sophisticated media presentations will likely attract more players.

BRIEF DESCRIPTION OF THE FIGURES

Embodiments of the invention are illustrated in the Figures of the accompanying drawings in which.

DESCRIPTION OF THE EMBODIMENTS

Introduction

This section introduces some embodiments of the inventive subject matter.

Wagering game systems can include components for presenting coordinated media shows. Such systems can include wagering game machines outfitted with lights, audio speakers, video devices, and more. The systems can respond to certain events, such as players hitting large jackpots, by presenting coordinated media shows using the lights, audio speakers, video devices, etc. Some media shows call for flashing various lighting colors to music. In some instances, the colors are randomly chosen from a group of harmonious colors. For example, the system may randomly select colors from a pallet of harmonious blues and greens. In turn, the wagering game machines present the randomly-selected blue and green colors in rhythm with a song. Because the system can choose the colors randomly, the shows are less repetitive. Moreover, because the pallets can include colors that work together, random color selection does not result in poor aesthetics.

Example Systems

Figure 1:
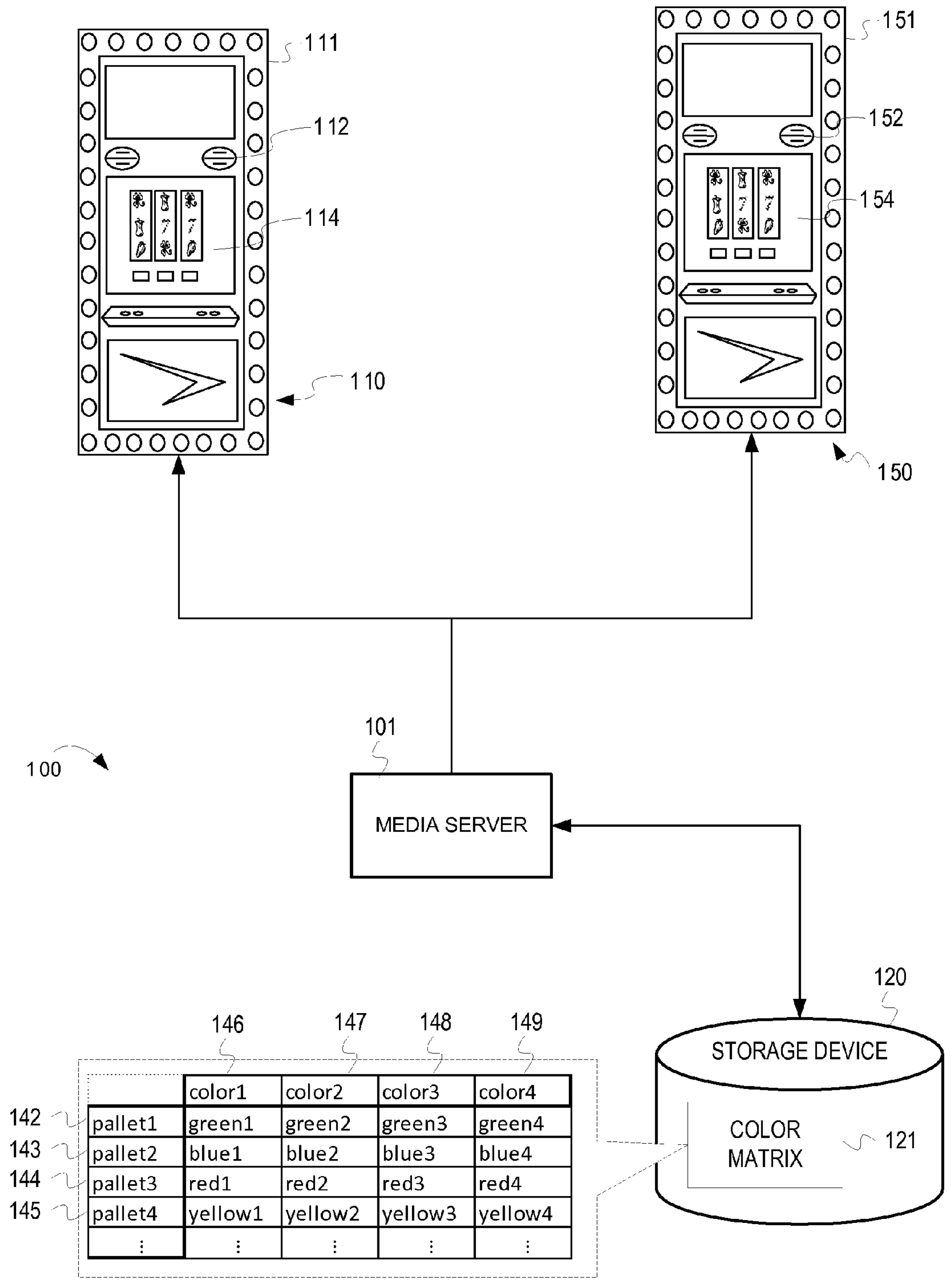
FIG. 1 is a block diagram illustrating a wagering game system capable of presenting media shows.

FIG. 1 is a block diagram illustrating a wagering game system capable of presenting media shows. As noted above, the media shows can include randomly-colored flashing lights set to music and/or other media content. The wagering game system 100 (a.k.a. wagering game network) includes a media server 101 connected to wagering game machines 110 and 150. The system 100 can include any number of wagering game machines, which can be arranged in any suitable fashion (e.g. side-by-side in a bank, etc.). The wagering game machines 110 and 150 include lighting devices 111 and 151, audio output devices 112 and 152, and video display devices 114 and 154.

The lighting devices 111 and 151 can include a plurality of light sources, such as light emitting diodes (LEDs), incandescent lights, and/or any other suitable light source. In some embodiments, each light is separately addressable and programmable. Programming parameters can include color, brightness, blink frequency and duration, fade in/out rate, etc. In some embodiments, the lighting devices 110 can pivot, rotate, tilt, pan, telescope, or otherwise move. In some instances, each light can move independently, while in other instances, all the lights move as a unit. The lighting devices 110 can also include reflectors (stationary or movable) that facilitate various lighting effects.

In some embodiments, the wagering game machines 110 and 150 include data for presenting the media shows. The data can include audio content (e.g., MP3 files, WAV files, etc.), video content (e.g., MPEG files, QuickTime® files, MOV files, etc.), lighting content, and other suitable content. The media files can include markers used for synchronizing presentations across multiple media types, such as synchronizing lighting effects with audio content. In some instances, the content may be streamed to the machines 110 and 150 for presentation, or the machines may download the data (e.g., media files) just-in-time for a media show.

The lighting content can include indicia indicating lighting choreography for a group of lighting devices. The lighting content can indicate lighting colors, how lights illuminate, light intensity, and any other suitable programmable lighting parameters. In some instances, light shows require that lighting content be assembled before commencing a light show. For example, a wagering game machine's lighting engine (see FIG. 4) may receive lighting content that does not indicate lighting colors for a light show. The lighting engine can randomly select (or select using any suitable criteria) lighting colors based on a color matrix. In turn, the lighting engine can use the color selections along with the lighting content to present a portion of the media show.

The media server 101 is also connected to a storage device 120 including color pallets (described below) for use in the media shows. The storage device 120 and media server 101 can reside in the same device, or they can reside in separate devices. In some embodiments, the media server 101 can reside in a wagering game machine or other component.

During media shows, the media server 101 directs the lighting devices 111 and 151 to present lighting effects. The lighting effects may be synchronized to each other, or they may be independent of each other. For example, the media server 101 can direct the lighting devices 111 and 151 to present synchronized lighting effects to celebrate a jackpot win on both machines 110 and 150. Alternatively, the media server 101 can direct the lighting devices 111 to present lighting effects associated with wagering games being played on the machine 110. For some media shows, the media server 101 selects lighting colors based on color pallets in a color matrix 121, and directs lighting devices to flash lights of the selected colors. In some instances, the flashing lights are coordinated with music, video, and/or other media.

As shown, the color matrix 121 includes color pallets 142-145, where each pallet includes a plurality of colors. The pallet 142 includes a family of greens—green1, green2, green3, and green4. The pallet 143 includes a family of blues—blue1, blue2, blue3, and blue4. The pallet 144 includes a family of reds—red1, red2, red3, and red4. The pallet 145 comprises a family of yellows—yellow1, yellow2, yellow3, and yellow4. Although each pallet in the color matrix 121 includes variants of one color, the pallets can include different colors. The colors in a pallet can be harmonious, discordant, or some combination thereof. Likewise, any two pallets can be harmonious, discordant, or some combination thereof.

The color matrix 121 may comprise additional pallets, and each pallet can include any number of colors. In some instances, lighting technicians define the pallets (i.e., the pallets are pre-selected). The technicians can design the pallets to evoke moods, coordinate with other media, support various effects, etc. In addition, different color matrices can be defined for different media shows.

Figure 2:
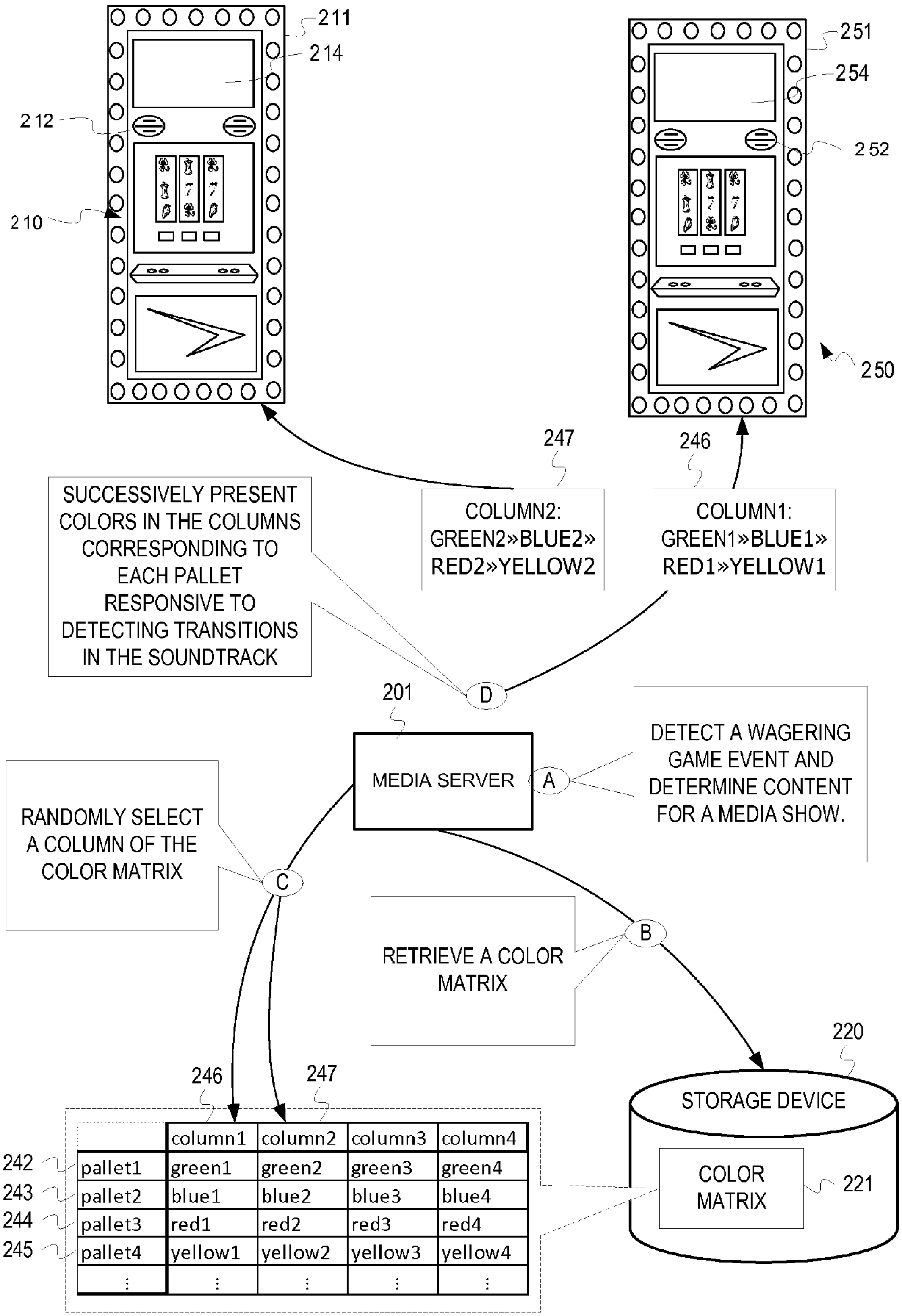
FIG. 2 is a dataflow diagram illustrating operations and dataflow attendant to a wagering game system presenting a media show.

This discussion continues with some embodiments that can randomly select lighting colors and present those colors in a media show. FIG. 2 shows one such embodiment.

Example Data Flow and Operations

FIG. 2 is a dataflow diagram illustrating operations and dataflow attendant to a wagering game system presenting a media show. The dataflow and operations are shown in stages A-D.

At stage A, a media server 201 detects an event for which it will initiate a media show. In some instances, the event is associated with a player winning a jackpot. Alternatively, the event can be associated with advertising (e.g., an advertisement for upcoming music concert), events outside the casino (e.g., live sporting events), attract modes, etc.

After detecting the event, the media server 201 can determine the media show's audio content, video content, and lighting content. As part of the media show, the media server 201 will randomly select lighting colors for the media show, and present the audio, video, and lighting content, as described in more detail below.

At stage B, the media server 201 retrieves a color matrix 221 for use in selecting lighting colors for the media show. In FIG. 2, the color matrix includes four color pallets, where each pallet includes variations of the same color. The media server 201 will use the color matrix to select colors for lights in the media show.

At stage C, the media server 201 selects, based on the color matrix 221, lighting colors for the media show. In some instances, for each lighting device that will participate in the media show, the media server 201 randomly chooses a column in the color matrix 201. For example, the media server 201 may choose the column1 (see 246) for the lighting device 211, and column2 (see 247) for the lighting device 251. Different embodiments may include different numbers of lighting devices, so the media server 201 may select any number of columns from the color matrix 201. In other embodiments, the media server 201 can select any number of columns irrespective of the number of lighting devices. Although the media server 201 may select columns randomly, it can also select columns based on some criteria. For example, the media server can select color columns based on data input by a technician (e.g., a mood selection, color selection, etc.), data about activities in the casino (e.g., coin-in, foot traffic, etc.), data about activities outside the casino (e.g., live sporting events, concerts, etc.), etc.

After selecting columns from the color matrix 221, the media server 201 can a priori determine all lighting colors for the media show, or it can determine lighting colors dynamically. For example, a show may call for fifty light flashes from the lighting device 111. The media server 201 can determine colors for all fifty light flashes by randomly selecting fifty colors from the color matrix column associated with the lighting device 111. The media server can do this for all lighting devices participating in the media show. In turn, the media server 201 can provide a color list to the lighting devices (e.g., along with an instruction to commence the media show).

As noted, some embodiments of the media server 201 can dynamically determine lighting colors. In such embodiments, the media server 201 can provide the color matrix columns to the lighting devices or other components. In turn, the lighting devices themselves (or other components) can randomly select lighting colors. Thus, color selection may occur before or during the media show.

As noted above, the color pallets (e.g., 242-245) can be designed to work together to achieve various effects and illicit various moods. Thus, although the colors are selected randomly, they work together to achieve desired aesthetic affects. The operations continue with stage D.

At stage D, the media server 201 initiates a media show during which the lighting devices 211 and 251 present colored lighting. In some embodiments, media content for the media show reside away from the media server. Thus, in some instances, the media server 201 transmits instructions to commence the media show, and information about lighting colors (e.g., the color columns or the predetermined list of colors).

In other embodiments, media files reside on the media server 201. In such embodiments, the media server 201 transmits the media files along with instructions to commence the media show and color information (i.e., the predetermined color list or color columns). In some instances, the media server 201 streams the media content, and the media devices use the streaming content to present the media show. In other instances, some or all media devices do not begin presenting media content until media files arrive in their entirety. Therefore, some embodiments support streaming media, while others support just-in-time media downloading. The operations continue at stage E.

At stage E, the video display devices 214 and 254, audio output devices 212 and 252, and lighting devices 211 and 251 present the media show. The media show can be any combination of audio, video, and lighting content. For example, the media show can include a song, motion video of a band singing the song, and lights flashing and changing colors to the song's beat.

In some embodiments, the media presentations are facilitated by components in the wagering game machines 210 and 250. For example, the wagering game machine 210 may receive instructions to commence a media show, along with lighting color information (e.g., color columns, a color list, etc.). Using local media playback components (e.g., audio and video codecs, signal processors, lighting engines, etc.), locally stored media files, and the media devices (214 & 212), the wagering game machine 210 can begin presenting audio content and video content. In presenting the lighting content, the wagering game machine 210 may determine lighting colors based on the color information received during stage D. For example, the machine 210 can include a lighting engine (not shown) that chooses lighting colors (e.g., by randomly selecting one or more colors from the color columns), and causes the lighting device to flash the selected color(s).

In some instances, the wagering game machine's lighting engine can monitor media files (e.g., audio files, video files, etc.) for lighting synchronization markers stored in the media files. In turn, the lighting engine can detect the markers and facilitate lighting effects based the markers. For example, an audio file can include markers that coincide with a drum beat. Upon detecting each marker, the lighting engine can select a color and other lighting parameters, and illuminate the lighting device to the drum beat. If the media content does not include lighting synchronization markers, some embodiments can synchronize lighting effects based on other data in the media content. For example, the lighting engine may process audio content to detect rhythms, and program the lighting device 211 to flash with the rhythm. In some instances, parameters of the media content (e.g., rhythm frequency, tone, frame rate, brightness, etc.) can affect color choices and other light programming parameters.

In some embodiments, the media server 201 can change pallets during a media show. To facilitate such a color change, the media server 201 can send new colors (e.g., one or more new color columns selected from the color matrix, a new color list created from the color matrix, etc.) to the wagering game machines 210 and 250, and other lighting devices (not shown). The media server 201 can change color pallets based on markers in a media stream or other factors (e.g., data input by casino operators, key changes, timing changes, etc.). The media server 201 may select different pallets to evoke different moods, facilitate various effects, draw attention of particular players, and more. If the media content includes more changes than pallets, the media server 201 can loop through the pallets, choose pallets at random, or employ some other suitable methods for selecting pallets in response to indicia indicating pallet changes.

More Example Operations

Figure 3:
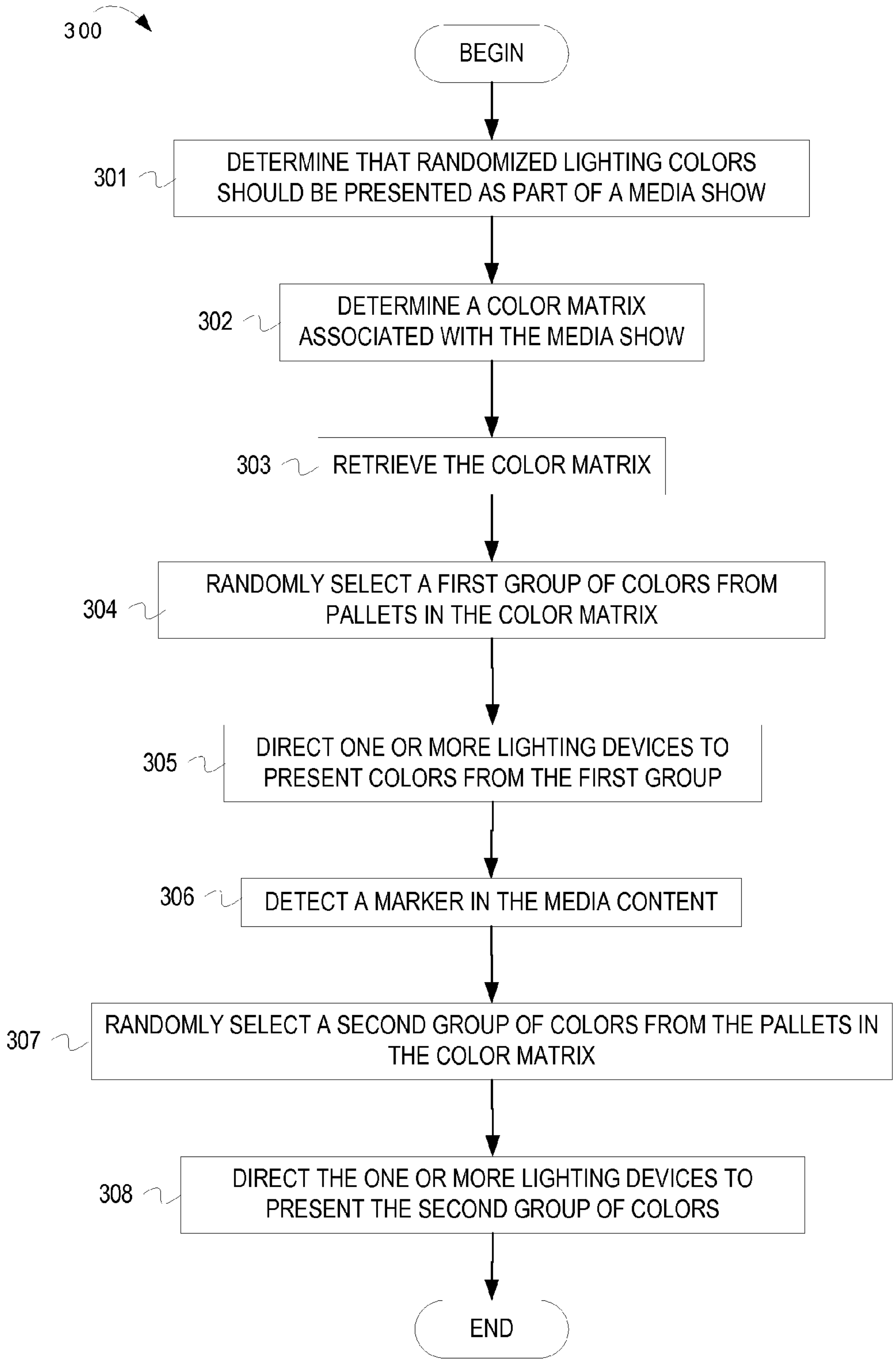
FIG. 3 is a flowchart depicting example operations for presenting a randomized color pattern as part of a media show.

FIG. 3 is a flowchart depicting example operations for presenting randomized lighting colors as part of a media show. More specifically, the flowchart 300 shows how embodiments can change color groups based on markers or other indicia in the media content.

In FIG. 3, flow begins at block 301, where a media server determines that randomized lighting colors should be presented as part of a media show. For example, the media server detects a spin associated with a spinning-reels-type wagering game machine. As part of a media show associated with the spin, the media server will facilitate a color light show on lighting devices mounted on or around the wagering game machine. The color light show occurs when the wagering game machine presents spinning reels. As another example, in some embodiments, player account preferences allow players to specify songs that play during their jackpot wins. The media server can detect a jackpot win, and facilitate presentation of the song and a color light show. The media content can be presented on the winning player's wagering game machine, on a bank of machines, and on media devices detached from any wagering game machines. Flow continues at block 302.

At block 302, the media server selects a color matrix for the media show. In some instances, different color matrices are defined for different media shows. For example, pallets defined for spin events may differ from pallets associated with jackpot wins. Pallets colors can match colors in a theme of the wagering game. As another example, a color matrix associated with a fast song may provide more contrast between pallets than a color matrix associated with a slower song. Flow continues at block 303.

At block 303, the media server retrieves the color matrix. For example, the media server retrieves the color matrix from a local storage device. As another example, the media server can retrieve the color matrix from a remote storage device. Flow continues at block 304.

At block 304, the media server randomly selects a group of colors based on the color matrix. The media server can randomly select, using a random number generator, the color group from the color matrix. In some embodiments, the color group includes colors from more than one pallet (e.g., the group corresponds to a column of the color matrix, such as the colors under "column1" in the color matrix 221). In other embodiments, the group includes colors from a single pallet of coordinating colors (e.g., the group includes colors from a row in the color matrix, such as the row identified by "pallet1" in the color matrix 221). In some instances, the media server selects a plurality of color groups (e.g., columns corresponding to column1 and column2 in the color matrix 221). Flow continues at block 305.

At block 305, the lighting server directs one or more lighting devices to present one or more colors form the color group. This may include generating commands specific to the lighting devices, where the commands may indicate the colors. For example, if the media server selected column1 for a lighting device, the media server generates commands specific to the lighting device. In turn, the media server transmits the commands to the lighting devices. Alternatively, components other than the media server may generate lighting-device-specific commands. For example, the wagering game machine's components (e.g., lighting engines—see FIG. 4, etc.) can generate lighting device commands. As a result of block 305, lighting devices present lighting effects defined by lighting content and one or more colors from the color group. Flow continues at block 306.

At block 306, the media server detects indicia indicating new color selections. For example, the media server may detect a color transition marker (e.g., inserted by a technician) in an audio stream of the media show. As another example, the media server may detect a transition marker in video content used in presenting spinning reels for the spin event (e.g., detected at block 301). The color transition markers cause the media server to select new color groups. Thus, the lighting devices will cease using the color group determined at block 304, and will continue with a newly selected color group. Flow continues at block 307.

At block 307, the media server randomly selects a new color group based on the color matrix, which was retrieved at block 303. In some instances, the media server may retrieve another color matrix and select the new color group based on the new color matrix. Flow continues at block 308.

At block 308, the media server directs the set of lighting devices to present one or more colors from the new color group.

In some embodiments, other lighting effects can be presented in addition to randomized colors. For example, a media server can cause a lighting device to blink, fade in/out, increase/decrease brightness, chase, etc. while also presenting one or more randomized colors selected based on a color matrix. In the discussion above, operations were described in association with certain components. However, in some embodiments, the operations can be performed by components other than those described herein.

In certain embodiments, the operations can be performed by executing instructions residing on machine-readable storage media (e.g., software), while in other embodiments, the operations can be performed by hardware and/or other components (e.g., firmware). In some embodiments, the operations can be performed in series, whereas in other embodiments, one or more of the operations can be performed in parallel. Moreover, some embodiments can perform less than all the operations shown in any flow diagram.

Example Wagering Game Systems

Figure 4:
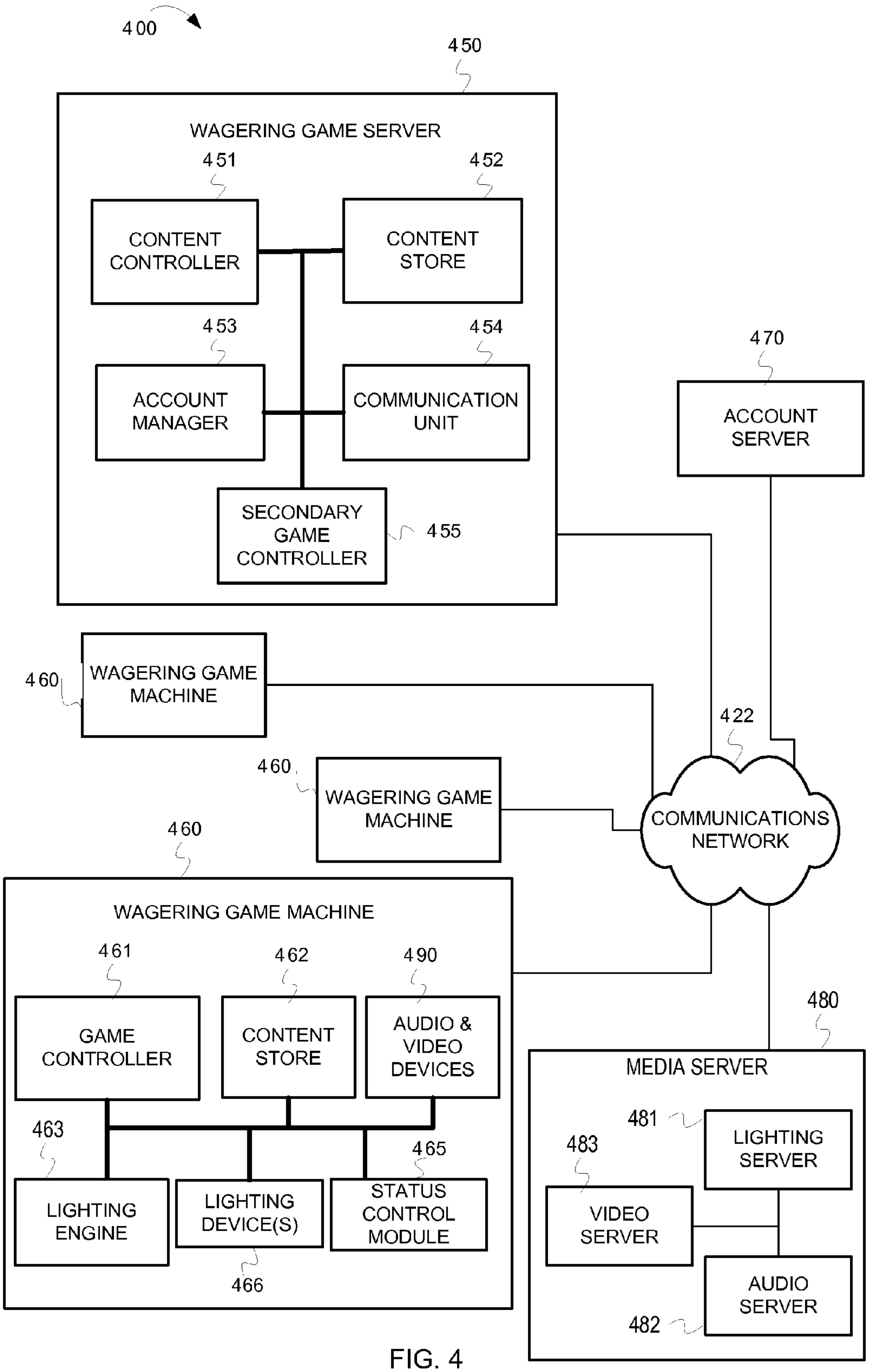
FIG. 4 is a conceptual diagram that illustrates an example wagering game system, according to some embodiments.

FIG. 4 is a conceptual diagram that illustrates an example wagering game system, according to some embodiments. The wagering game system 400 includes a wagering game server 450, wagering game machines 460, an account server 470, and a media server 480.

The wagering game sever 450 is configured to control wagering game content, provide random numbers, and exchange wagering game information, account information, and other information with other devices of the system 400. The wagering game server 450 can include a game controller 451 configured to manage and control content for the presentation on the wagering game machines 460 and their media devices, such as lighting devices, video devices, audio devices, etc. In some embodiments, the game controller 451 determines game results (wins/loses) for games played on the wagering game machines 460. The game controller 451 can also generate random numbers and provide them to the wagering game machines 460, so the machines themselves can generate game results. The wagering game server 450 also includes a content store 452 configured to store content for presentation on the wagering game machines 460 and other devices. The wagering game server 450 also includes an account manager 453 configured to process information related to player accounts. For example, the account manager 453 can communicate wager amounts, game results amounts (e.g., win amounts), bonus game amounts, etc., to the account server 470. The wagering game server 450 also includes a communication unit 454 configured to exchange information with the devices shown in FIG. 4, and other devices. The wagering game server 450 also includes a secondary game controller 455 that controls secondary games (e.g., bonus games).

The wagering game machines 460 can present wagering games, process and exchange information, and present media content. In some embodiments, the machines 460 present media content on lighting devices connected to (and/or integrated with) the machines 460. The wagering game machines 460 also include a game controller 461 configured to present media content (e.g., audio, video, lighting content, etc.) on the wagering game machines 460. A content store 462 stores the media content in the wagering game machines 460.

In some embodiments, each wagering game machine 460 also includes a lighting engine 463 configured to control the lighting devices 466. As noted above, the lighting engine 463 can select lighting colors based on information received from the media server 480. For example, the lighting engine can randomly select lighting colors based on color columns or other information received from the media server 380. The lighting engine 463 can also generate commands and information for the lighting devices 466. The commands and information may be based on instructions and media received from the media sever 480. In some embodiments, the lighting engine 380 generates the instructions according to the DMX512 protocol.

In some embodiments, the lighting engine 463 can be external to the wagering game machine 460, such as attached to a cabinet associated with the wagering game machine 460. In other embodiments, the lighting engine 463 can be detached from the wagering game machine 460 and can be a separate device that controls lighting devices assigned to, proximate to, or in other ways associated with the wagering game machine 460.

The wagering game machine 460 can also include a status control module 465 configured to provide presentation status information to content control sources (e.g., wagering game servers, peer-to-peer game controllers, environmental control servers, lighting engines, etc.). The status information can provide information about events that affect the wagering game machine 460, or other devices or components associated with the wagering game machine 460. The events can indicate that lighting devices associated with the wagering game machine 460 are inactive, unavailable, or otherwise ineligible to receive content at a given time. Thus, the status control module 465 can broadcast status information to all game controllers and other sources that need to know whether the wagering game machine 460, or lighting devices associated with the wagering game machine 460, are available to participate in content presentations (e.g., a light show, a gaming effect, etc.).

The wagering game machine 460 audio and video devices 490, which can include any components necessary for receiving, storing, and presenting audio and video content. Such components can include decoders, processing hardware, display devices, audio speakers, etc.

The wagering game system 400 also includes a media server 480. The media server 480 can control multimedia presentations on media devices (e.g., lighting devices) associated with the wagering game machines 460. The media server 480 comprises a lighting server 481, audio server 482, and video server 483. When presenting media shows, the lighting server 481 can transmit lighting information to the wagering game machines' lighting engines 463, and audio and video content to the machine's game controller 461. The lighting server 481 can utilize a color matrix to present randomized lighting effects, as described herein. The color matrix can include a group of pallets where each of the pallets can comprise a group coordinating colors. The lighting server 481 can randomly select pallets, color groups, and individual colors for use in presenting lighting effects that are part of media shows. The lighting server 481 can also detect markers in audio and video content, and randomly select new pallets, color groups, and individual colors for use in modifying lighting effects of the media show.

The wagering game system's account server 470 can control player accounts. The player accounts can include financial accounts, player tracking accounts, social networking accounts, and more. The player accounts can be accessible via the wagering game machines, internet computers, mobile devices, etc. Player account information can include account settings, various preferences, player profile data (e.g., name, avatar, etc.), financial information, virtual assets, etc. The account server 470 can also maintain social contacts and other social networking information. The account server 470 can also provide auditing capabilities, and it can track performance of players, machines, servers, etc.

Each component shown in the wagering game system architecture is shown as a separate and distinct element connected via a communications network 422. However, some functions performed by one component could be performed by other components. For example, the wagering game server 450 can also be configured to perform functions of the account server 470, the media server 480, and other network elements and/or system devices. Furthermore, the components in FIG. 4 can be arranged in any suitable configuration, such as in single device, multiple devices, in a different combination than what appears in FIG. 4, etc. For example, the account manager 453 and the communication unit 454 can be included in a wagering game machine 460 instead of being a part of the wagering game server 450. Further, in some embodiments, the wagering game machines 460 can determine wagering game outcomes, generate random numbers, etc., instead of the wagering game server 450.

The wagering game machines described herein (e.g., wagering game machine 460) can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machine (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machine can present a graphical representation of such outcome or asset modification to the user (e.g., player). In a thick-client example, the wagering game machines can determine game outcomes and communicate the outcomes to the wagering game server for recording or managing a player's account. In other embodiments, the wagering game machines 460 can operate without the server 450. That is, the machines 460 can include components (e.g., game controllers) that determine game results, select content, detect events in the system 400, etc. without input from other components in the wagering game system 400. Moreover, the machines 460 can perform one or more operations of the media server (e.g., the lighting engine can perform operations for selecting color pallets, as described above—see FIGS. 2 & 3).

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system 400 can be implemented as software, hardware, any combination thereof, or other forms of embodiments not listed. For example, any of the network components (e.g., the wagering game machines, servers, etc.) can include hardware and/or machine-readable storage media including instructions for performing the operations described herein. Machine-readable storage media includes any mechanism that can store and provide information in a form readable by a machine (e.g., a wagering game machine, computer, etc.). For example, machine-readable storage media includes read only memory (ROM), random access memory (RAM), magnetic disk storage media, optical storage media, flash memory machines, etc. Additionally, some embodiments can include signal media capable of transmitting instructions readable by a machine. Signal media can include any media (e.g., fiber optic media, copper wire, etc.) suitable for transmitting software over a network.

More about Wagering Game Machines

Figure 5:
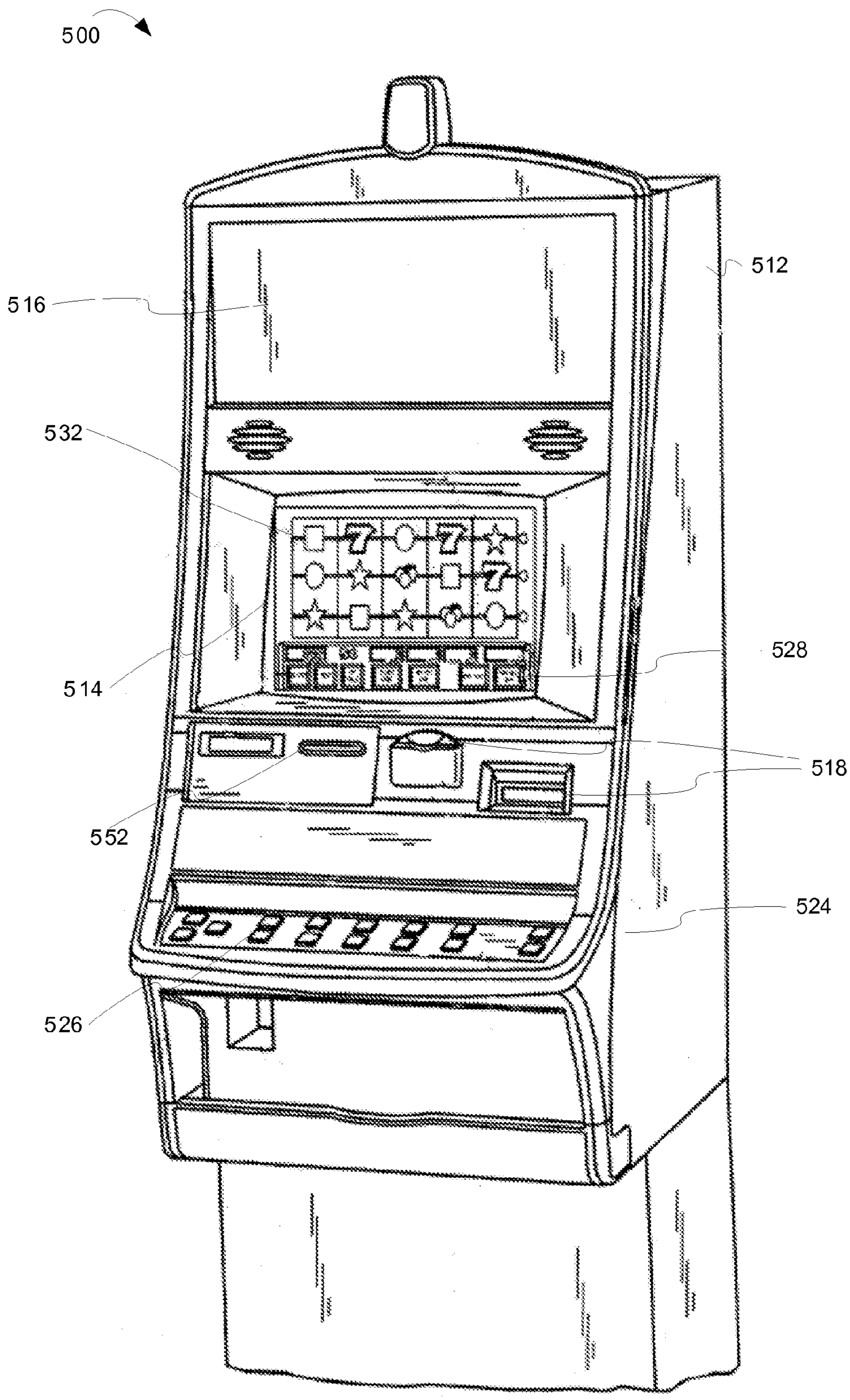
FIG. 5 is a perspective view of a wagering game machine, according to example embodiments of the invention.

FIG. 5 is a perspective view of a wagering game machine, according to example embodiments of the invention. Referring to FIG. 5, a wagering game machine 500 is used in gaming establishments, such as casinos. According to embodiments, the wagering game machine 500 can be any type of wagering game machine and can have varying structures and methods of operation. For example, the wagering game machine 500 can be an electromechanical wagering game machine configured to play mechanical slots, or it can be an electronic wagering game machine configured to play video casino games, such as blackjack, slots, keno, poker, blackjack, roulette, etc. Additionally, the wagering game machine can include lighting devices and other components for presenting media content, as described herein.

The wagering game machine 500 comprises a housing 512 and includes input devices, including value input devices 518 and a player input device 524. For output, the wagering game machine 500 includes a primary display 514 for displaying information about a basic wagering game. The primary display 514 can also display information about a bonus wagering game and a progressive wagering game. The wagering game machine 500 also includes a secondary display 516 for displaying wagering game events, wagering game outcomes, and/or signage information. While some components of the wagering game machine 500 are described herein, numerous other elements can exist and can be used in any number or combination to create varying forms of the wagering game machine 500.

The value input devices 518 can take any suitable form and can be located on the front of the housing 512. The value input devices 518 can receive currency and/or credits inserted by a player. The value input devices 518 can include coin acceptors for receiving coin currency and bill acceptors for receiving paper currency. Furthermore, the value input devices 518 can include ticket readers or barcode scanners for reading information stored on vouchers, cards, or other tangible portable storage devices. The vouchers or cards can authorize access to central accounts, which can transfer money to the wagering game machine 500.

The player input device 524 comprises a plurality of push buttons on a button panel 526 for operating the wagering game machine 500. In addition, or alternatively, the player input device 524 can comprise a touch screen 528 mounted over the primary display 514 and/or secondary display 516.

The various components of the wagering game machine 500 can be connected directly to, or contained within, the housing 512. Alternatively, some of the wagering game machine's components can be located outside of the housing 512, while being communicatively coupled with the wagering game machine 500 using any suitable wired or wireless communication technology.

The operation of the basic wagering game can be displayed to the player on the primary display 514. The primary display 514 can also display a bonus game associated with the basic wagering game. The primary display 514 can include a cathode ray tube (CRT), a high resolution liquid crystal display (LCD), a plasma display, light emitting diodes (LEDs), or any other type of display suitable for use in the wagering game machine 500. Alternatively, the primary display 514 can include a number of mechanical reels to display the outcome. In FIG. 5, the wagering game machine 500 is an "upright" version in which the primary display 514 is oriented vertically relative to the player. Alternatively, the wagering game machine can be a "slant-top" version in which the primary display 514 is slanted at about a thirty-degree angle toward the player of the wagering game machine 500. In yet another embodiment, the wagering game machine 500 can exhibit any suitable form factor, such as a free standing model, bar top model, mobile handheld model, or workstation console model.

A player begins playing a basic wagering game by making a wager via the value input device 518. The player can initiate play by using the player input device's buttons or touch screen 528. The basic game can include arranging a plurality of symbols along a payline 532, which indicates one or more outcomes of the basic game. Such outcomes can be randomly selected in response to player input. At least one of the outcomes, which can include any variation or combination of symbols, can trigger a bonus game.

In some embodiments, the wagering game machine 500 can also include an information reader 552, which can include a card reader, ticket reader, bar code scanner, RFID transceiver, or computer readable storage medium interface. In some embodiments, the information reader 552 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of operating a gaming system, the gaming system including and a gaming machine primarily dedicated to playing at least one casino wagering game, the gaming machine including an electronic display device and one or more electronic input devices, the method comprising:

detecting, via at least one of the one or more electronic input devices, a physical item associated with a monetary value that establishes a credit balance;

determining a winning result for the casino wagering game in response to an input indicative of a wager covered by the credit balance;

selecting, via a media server, audio content and lighting content associated with the result;

creating, by the media server, a color matrix, wherein the creating the color matrix comprises, determining, for each color in a first color pallet, a harmonious color in a second color pallet;

creating a first row in the color matrix, the first row including colors of the first color pallet;

creating a second row in the color matrix including colors of the second color pallet, wherein the first row and second row are aligned to form columns in the color matrix;

randomly selecting a column of the color matrix for use in presenting the lighting content;

randomly selecting colors from one of the columns of the color matrix; and presenting indicia of the winning result, the lighting content, and the colors on one or more of the lighting devices.

2. The method of claim 1, wherein the lighting content indicates one or more adjustments of the one or more lighting devices, wherein the adjustments include one or more of pivoting, panning, telescoping, and rotating.

3. The method of claim 1, wherein the audio content includes indicia indicating color changes associated with the lighting content.

4. One or more non-transitory machine-readable storage media including instructions which, when executed on one or more machines, cause the one or more machines to perform operations for presenting a casino wagering game on a wagering game machine, the operations comprising:

detecting, via an electronic input device of a wagering game machine, a physical item associated with a monetary value that establishes a credit balance for the wagering game machine;

determining a winning result for a casino wagering game in response to an input indicative of a wager covered by the credit balance;

determining audio content and lighting content associated with the event, wherein the lighting content indicates parameters for illuminating one or more lighting devices;

generating a color matrix including rows and columns, wherein each row includes colors from a color family, and wherein each column includes harmonious colors from the rows;

determining a winning result for the casino wagering game;

presenting indicia for the winning result, the audio content and the lighting content, wherein the presenting includes, providing the audio content for presentation over audio speakers;

randomly selecting colors from one of the columns; and illuminating the one or more lighting devices according to the lighting content and the randomly selected colors; and displaying the indicia on a video display device.

5. The one or more non-transitory machine-readable storage media of claim 4, wherein the illuminating the one or more lighting devices occurs in synchronization with indicia included in the audio content.

6. The one or more non-transitory machine-readable storage media of claim 4, the operations further comprising:

determining video content associated with the winning result; and presenting the video content the video display device.

7. The one or more non-transitory machine-readable storage media of claim 6, wherein the illuminating the one or more lighting devices occurs in synchronization with indicia in the video content.

8. The one or more non-transitory machine-readable storage media of claim 4, wherein the parameters indicate one or more of blink frequency, brightness level, and lighting device orientation.

9. A wagering game system comprising:

at least one processor; and one or more computer readable storage mediums having computer usable code program executable on the at least one processor, the computer usable program code including code to:

detect, via an electronic input device, a physical item associated with a monetary value that establishes a credit balance for a wagering game machine;

determine a winning result for a casino wagering game in response to an input indicative of a wager covered by the credit balance;

generate a color matrix, wherein the color matrix includes a first row including colors of a first color family and a second row including colors of a second color family, and wherein the color matrix includes columns that include harmonious colors from the first color family and the second color family;

control presentation of video content indicating the winning result for the wagering game;

select, in response to the result, lighting content and one or more of the columns of the color matrix, wherein the lighting content defines choreographed lighting effects, and wherein the one or more columns of the color matrix define coloring for the lighting effects;

randomly select colors from the one or more columns of the color matrix; and control presentation of the lighting effects in response to the winning result, the presentation of the lighting effects displaying the lighting content and the randomly selected colors.

10. The apparatus of claim 9, the computer usable program code further including code to:

color lights in the randomly selected colors; and present music with the lighting effects.

11. The apparatus of claim 9, the computer usable program code further including code to:

notify other wagering game machines about the lighting content.

12. The apparatus of claim 9, wherein the lighting content is associated with a light show, and wherein the light show involves other wagering game machines connected to a network.

13. The apparatus of claim 9, the computer usable program code further including code to:

present audio content synchronized to the lighting content.

14. A computer-implemented method for presenting a media show in a wagering game network, the method comprising:

generating a color matrix, wherein the generating the color matrix comprises, determining a first color pallet and a second color pallet, wherein the first color pallet includes colors of a first color family and the second color pallet includes colors of a second color family, determining, for each color in the first color family, a harmonious color in the second color family, creating a first row in the color matrix including the colors of the first color family and a second row in the color matrix including the colors of the second color family, wherein the first row and second row are aligned to form columns including, for each color in the first color family, the harmonious color in the second color family;

detecting, via at least one of the one or more electronic input devices, a physical item associated with a monetary value that establishes a credit balance;

determining a result for the wagering game in response to an input indicative of a wager covered by the credit balance;

determining that the media show will be presented in concert with the result, wherein the media show includes randomized lighting colors and audio content;

selecting, at random, a first group of colors from the color pallets of the color matrix;

directing one or more lighting devices to present the first group of colors;

directing one or more audio speakers to present the audio content;

detecting, in the audio content, indicia instructing selection of another group of colors from the color pallets of the color matrix;

selecting, at random, a second group of colors from the color pallets of the color matrix; and directing the one or more lighting devices to present the second group of colors.

15. The computer-implemented method of claim 14, wherein the first group of colors was selected from a first column of the color matrix, and wherein the second group of colors was selected from a second column of the color matrix.

16. The computer-implemented method of claim 14, wherein the lighting devices are associated with at least one wagering game machine.

17. The computer-implemented method of claim 14, wherein the detecting indicia includes monitoring the audio content for one or more of rhythm changes, markers inserted by a technician, and key changes.

18. The computer-implemented method of claim 14, wherein the directing the one or more lighting devices to present the first and second groups of colors comprises:

generating commands for the one or more lighting devices, wherein the commands identify ones of the lighting devices, and indicate at least one color from the first and second groups of colors; and transmitting the commands to the ones of the lighting devices.

19. The computer-implemented method of claim 14 further comprising:

presenting, on the one or more lighting devices, lighting effects in addition to the first and second groups of colors, wherein the lighting effects include one or more of blinking, fading-in, fading-out, increasing brightness, and decreasing brightness.

20. A method for presenting a media show in a wagering game system, the method comprising:

creating a color matrix in a memory device, wherein the color matrix includes a first row including colors of a first color family and a second row including colors of a second color family, and wherein the color matrix includes columns that include harmonious colors from the first color family and the second color family;

determining that the media show will be presented in response to a winning result of a wagering game presented on a wagering game machine, wherein the media show includes randomized lighting colors and audio content;

detecting, via at least one of the one or more electronic input devices, a physical item associated with a monetary value that establishes a credit balance;

determining the winning result for the wagering game in response to an input indicative of a wager covered by the credit balance;

selecting, at random, colors from a first column of the color matrix in the memory device; and directing, via communications over a network, one or more lighting devices to present, as part of the media show, the colors from the first column of the color matrix.

21. The method of claim 20 further comprising:

directing, as part of the media show, one or more audio speakers to present the audio content;

detecting, in the audio content, indicia instructing selection of another columns of the color matrix;

selecting, at random, a second column of the color matrix; and directing the one or more lighting devices to present, as part of the media show, colors from the second column of the color matrix.

* * * * *